Patented Mar. 20, 1951

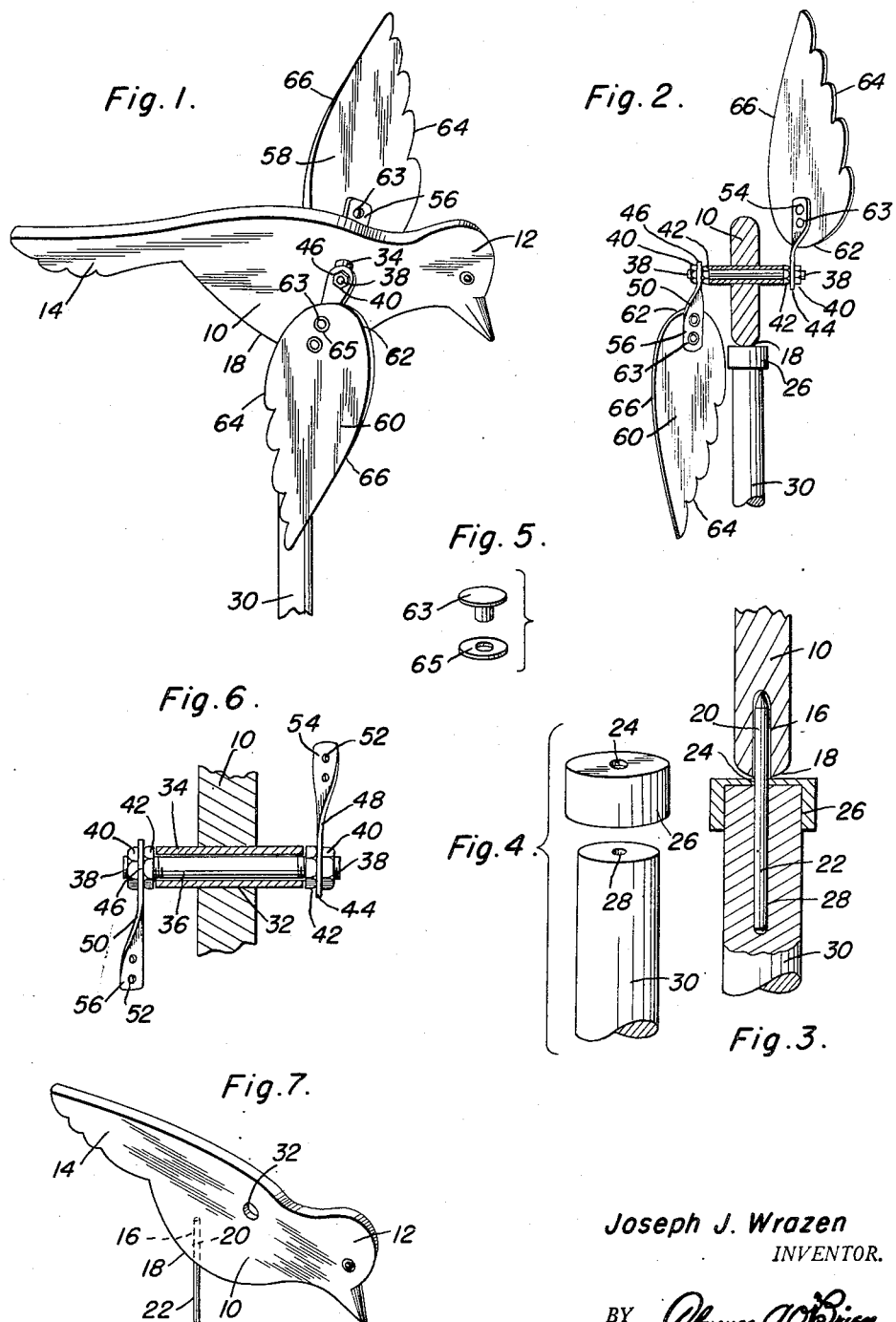
March 20, 1951    J. J. WRAZEN    2,545,801
ORNAMENTAL ROTATABLE BIRD, INCLUDING ROTATABLE WINGS
Filed Nov. 17, 1947
Joseph J. Wrazen
INVENTOR.

2,545,801

UNITED STATES PATENT OFFICE 2,545,801

ORNAMENTAL ROTATABLE BIRD, INCLUDING ROTATABLE WINGS

Joseph J. Wrazen, East Paterson, N. J., assignor of one-half to Peter Wrazen, East Paterson, N. J.

Application November 17, 1947, Serial No. 786,373

2 Claims. (Cl. 46—53)

This invention relates to new and useful improvements in lawn decorations and the primary object of the present invention is to provide a decorative ornament for lawns and the like including a miniature bird having a pair of rotatable wings that are actuated by wind engaging the same.

Another important object of the present invention is to provide a lawn decoration including a rotatable body mounted for horizontal movement upon an upright and a pair of vertically rotatable wing elements mounted on said body whereby the same will be actuated to simulate the actual movement of a bird or fowl.

A further object of the present invention is to provide a lawn decoration that is small and compact in structure and which is quickly and readily applied to a supporting structure in a convenient manner.

A still further aim of the present invention is to provide a lawn decoration that is simple and practical in construction, strong and reliable in use, relatively inexpensive to manufacture, neat and attractive in appearance, and otherwise well adapted for the purposes for which the same is intended.

Other objects and advantages reside in the details of construction and operation as more fully hereinafter described and claimed, reference being had to the accompanying drawings forming part thereof, wherein like numerals refer to like parts throughout, and in which:

Figure 1 is a perspective view of the present lawn decoration, and with parts of the support broken away and shown in section;

Figure 2 is a front elevational view of Figure 1 and with parts of the bird body broken away and shown in section;

Figure 3 is an elevational view partly in section showing the manner in which the bird body is rotatably secured to the support;

Figure 4 is a fragmentary group perspective view of the support showing the bearing cup spaced relative to the support;

Figure 5 is a group perspective view showing the means for securing the wings relative to the supporting strips;

Figure 6 is an enlarged fragmentary view of Figure 2, and showing the wings removed therefrom; and, Figure 7 is a perspective view of the bird body used in conjunction with the present invention and showing the pivot pin secured to the body.

Referring now to the drawings in detail, wherein for the purpose of illustration, there is disclosed a preferred embodiment of the present invention, the numeral 10 represents the body portion of the present lawn decoration preferably simulating the body of a bird or fowl having a head 12 and tail 14. Fixedly secured in a recess or bore 16 provided in the lower edge 18 of the body 10, is one end 20 of an outwardly projecting pivot pin 22 that extends through a central aperture 24 provided in a bearing cap 26 that frictionally engages a further recess or bore 28 provided in one end of a support post 30 so that the lower edge 18 of the body 10 will bear upon the cap 26. It should be noted, that the edge 18 is convexed longitudinally as well as transversely to reduce the area of the edge 18 bearing upon the cap 26.

Fixed in a transverse aperture 32 provided in the body 10, is a journal sleeve 34 the ends of which extend outwardly from opposite sides of the body 10. Rotatably mounted in the sleeve 34 is a shaft 36 having externally threaded end portions 38 that extend outwardly from the ends of the sleeve 34 that adjustably engage pairs of nuts 40 and 42 between which there are clampingly locked the ends 44 and 46 of a pair of twisted attaching strips 48 and 50 having a plurality of apertures 52 at their free ends 54 and 56.

The numerals 58 and 60 represent a pair of wing elements substantially triangular in form, each including rounded or arcuate inner edges 62, and arcuate outwardly converging side edges 64 and 66, one of which, for example edge 64, is undulated to simulate the wing tips of a bird's wing. These wings are secured to the free ends 54 and 56 of the twisted strips adjacent the rounded edges 62 of the wings by headed rivets and washers 63 and 65.

It should be noted, that the wings 58 and 60 radiate from opposite sides of the shaft 36, the same are preferably constructed of a flat material, and that the same are twisted or inclined oppositely relative to the body 10 so that the wings may rotate in a vertical plane and the body may rotate in a horizontal plane due to wind engaging the same when the support post 30 is embedded in a ground surface or secured to a supporting element in a vertical position.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is described as new is:

1. A lawn decoration comprising an upright having an axial recess in its upper end, a reinforcing cap on the upper end of said upright and having a central aperture in registry with said recess, a flat body member having a lower edge, said edge being convexed longitudinally and also transversely, a portion of said edge being upon said cap, a pivot pin depending from the lower edge of said body member and received in said aperture and said recess for rotation, said body member having a horizontal opening therein, a horizontal bearing sleeve fixed in said opening, a shaft journaled for rotation in said sleeve and including threaded end portions projecting from the ends of said sleeve, a pair of nuts threaded on each end of said shaft, a pair of straps, each of said straps having a hole receiving the shaft, said straps being held on the ends of the shaft by said pairs of nuts, said straps being clamped between the nuts of each of said pair of nuts, a pair of flat wings, said straps projecting laterally from diametrically opposite sides of said shaft and having twisted outer end portions disposed at an inclined angle relative to each other and to the shaft, and fasteners securing the twisted end portion of said straps against said wings to retain the wings inclined relative to each other and to the shaft.

2. A lawn decoration comprising an upright, an elongated flat body rotatably supported on and disposed substantially perpendicular to said upright, a shaft journaled for rotation on said body and having its ends projecting from the flat faces of the body, a pair of twisted strap detachably secured to the ends of said shaft and projecting laterally from diametrically opposite sides of the shaft, and flat wings secured to said straps, said wings being inclined relative to each other and to said shaft.

JOSEPH J. WRAZEN.

REFERENCES CITED

The following references are of record in the file of this patent:

UNITED STATES PATENTS

| Number | Name | Date |
|---|---|---|
| 507,381 | Newton | Oct. 24, 1893 |
| 1,538,562 | Koshalko | May 19, 1925 |
| 1,675,141 | Scholl | June 26, 1928 |
| 1,792,396 | Robinett | Feb. 10, 1931 |